No. 799,691.

PATENTED SEPT. 19, 1905.

T. L. & T. J. STURTEVANT.
VEHICLE BRAKE.
APPLICATION FILED APR. 24, 1905.

Witnesses:
C. M. Sweeney
J. D. Kluge

Inventors:
Thomas L. Sturtevant
Thomas J. Sturtevant
by Henry Calver
Atty.

UNITED STATES PATENT OFFICE.

THOMAS LEGGETT STURTEVANT, OF QUINCY, AND THOMAS JOSEPH STURTEVANT, OF WELLESLEY, MASSACHUSETTS, ASSIGNORS TO STURTEVANT MILL COMPANY, OF PORTLAND, MAINE, A CORPORATION OF MAINE.

VEHICLE-BRAKE.

No. 799,691.    Specification of Letters Patent.    Patented Sept. 19, 1905.

Application filed April 24, 1905. Serial No. 257,102.

*To all whom it may concern:*

Be it known that we, THOMAS LEGGETT STURTEVANT, residing at Quincy, and THOMAS JOSEPH STURTEVANT, residing at Wellesley, in the county of Norfolk and State of Massachusetts, citizens of the United States, have invented or discovered certain new and useful Improvements in Vehicle-Brakes, of which the following is a specification, reference being had therein to the accompanying drawings.

This invention relates to a brake which is more especially intended for use with motor-vehicles and which is adapted to be operated by fluid-pressure, the present invention being an improvement upon the fluid-pressure brake device shown and described in our application, Serial No. 240,424, filed January 10, 1905.

Figure 1:
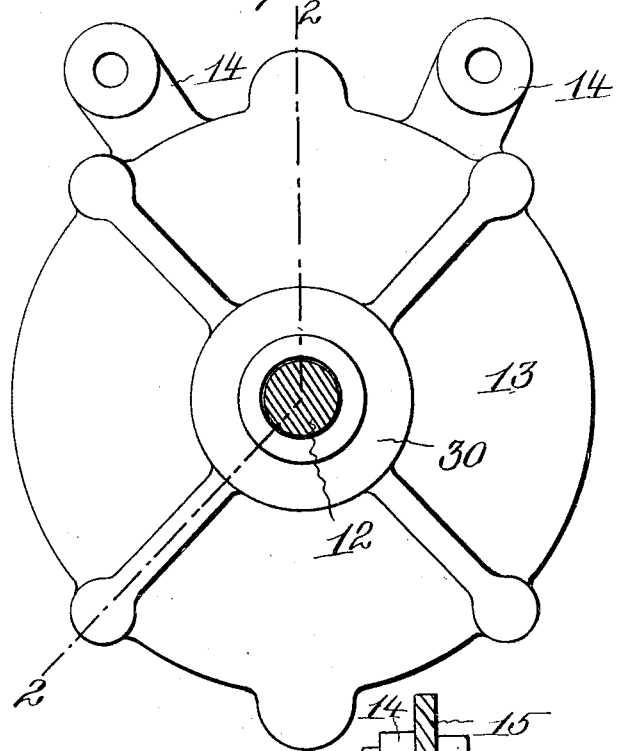
Figure 2:
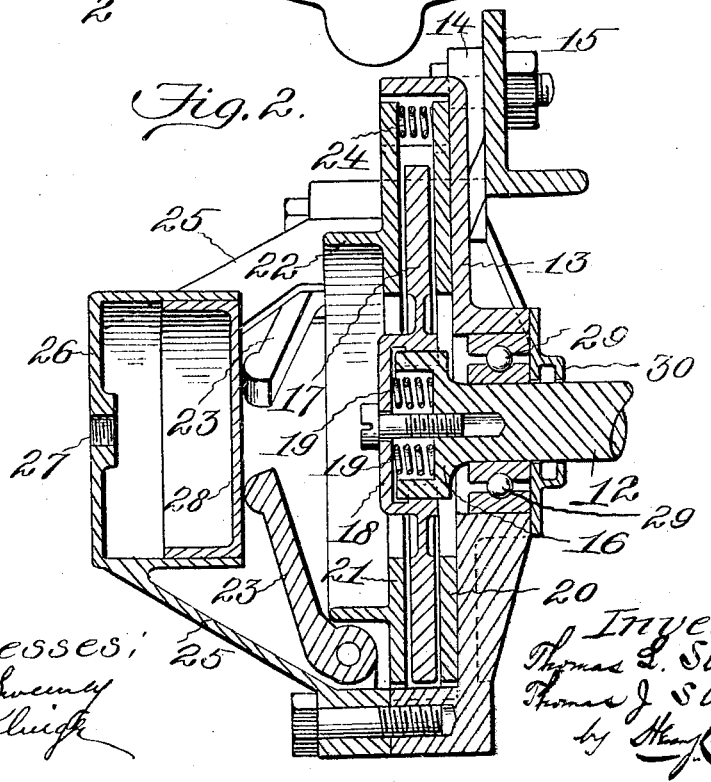

In the accompanying drawings, Figure 1 is a face view or elevation showing more especially the casing of the improved brake, and Fig. 2 is a section on line 2 2 of Fig. 1.

Referring to the drawings, 12 denotes a driven shaft, which may be the motor-shaft of an automobile or other vehicle or a shaft geared to or connected with said motor-shaft or any other shaft that requires braking control. The shaft 12 has a suitable bearing in a stationary frame or casing 13, provided with ears or lugs 14, by which it may be readily attached to a part 15 of the vehicle-frame. The shaft 12 is provided within the frame or casing 13 with a hub 16, with which a disk 17 has a notched engagement at its inner portion, so as to rotate with said shaft, said disk having a hub portion 18. The hub 16 of the shaft 12 is recessed or formed hollow for the reception of springs 19, which bear against the hub portion 18 of the disk 17, so as to have a tendency to force the said disk 18 outward to the position shown in Fig. 2.

Within the hollow frame or casing 13 are arranged two disks 20 and 21, having at their peripheral portions notched engagements with the said frame or casing, so as to be stationary therewith or restrained from rotation. Any desired number of these stationary and rotating friction rings or disks may be employed, although but three are herein shown, and these are made somewhat thick, so as to be capable of considerable wear.

The disk 21 is provided with an annular rib or flange 22, adapted to be engaged by levers 23, pivoted to the frame or casing 13, and the said disk 21 is normally forced outward toward said levers by springs 24.

Connected with the frame or casing 13 by spider-arms 25 is a cylinder 26, provided with an inlet or opening 27, and within said cylinder is a piston 28, engaged by the inner ends of the levers 23.

The disk-carrying shaft 12 is preferably provided within the frame or casing 13 with an antifriction bearing or bearings afforded by balls 29, these antifriction ball-bearings not being damaged by such frictional heat as may be generated when the brake is in use. Adjacent to the ball-bearing is a dust-lock 30.

The operation of the invention is as follows: The springs 19 normally hold the rotating disk 17 out of engagement with the stationary disk 20, and the springs 24 normally hold the stationary disk 21 out of engagement with the rotating disk 17, so that there will be no friction between these disks when the vehicle is running normally when the brake is off. When, however, it is desired to check or arrest the movement of the shaft 12, and thus slow up or stop the motor-vehicle, air or other fluid under pressure and derived from a suitable air-pump, storage-tank, or other source of supply will be admitted to the pressure-cylinder 26 through the inlet 27, and the piston 28 will be forced inward against the levers 23, which will in turn by overcoming the stress of the springs 19 and 24 force the friction-disks 21, 17, and 20 into frictional engagement with each other to any desired degree, as determined by the pressure in the cylinder 26. When the brake is to be let off, the pressure of the pressure-cylinder is relaxed or released and the springs 19 and 24 will then instantly free the disks 17, 21, and 20 from frictional engagement with each other.

Other means than the piston 28 might be employed to operate the levers 23 to force the clutch disks or rings into frictional engagement with each other, if desired.

The spider-arms 25, which connect the pressure-cylinder 26 with the frame or casing 13, afford an opening between the said cylinder and its piston and the outer frictional disk 21, so that air can freely circulate about said disk and can enter more or less to the inner disk 17, and thereby serve to cool the said disks, so that they will not become too much heated by friction when the brake is in operation for a considerable length of time.

In this improved construction, in which levers are interposed between the piston and the friction-disks, the pressure-cylinder is comparatively small in diameter, so that the piston will act more quickly on the introduction of a given volume of air or other fluid-pressure medium than was possible with the construction shown in our application hereinbefore referred to. Also in this improved construction the springs 19 and 24 serve to quickly disconnect all the friction-disks from engagement with each other when the brake is let off, as also to hold them out of engagement at all times, excepting when the brake is applied. This last-named feature is also an improvement upon the construction shown in our application hereinbefore referred to, in which construction the springs acted only against the master-plate and the friction-disks were disengaged from each other when pressure in the cylinder was released only by the rotative movements of the movable disks, and there was therefore a possibility of more or less friction between the disks when the power or motor shaft was running normally and when no brake-pressure was intended to be applied.

Having thus described our invention, we claim and desire to secure by Letters Patent—

1. The combination with a stationary part or casing and a driven part or shaft, of a multiple-disk brake comprising disks or rings a portion of which are connected with said stationary part or casing, so as to be restrained from rotation, and a portion of which rotate with said shaft, a pressure-cylinder, a piston therein, and levers interposed between said piston and said disks.

2. The combination with a stationary part or casing and a driven part or shaft, of a multiple-disk brake comprising disks or rings a portion of which are connected with said stationary part or casing, so as to be restrained from rotation, and a portion of which rotate with said shaft, a pressure-cylinder, a piston therein, levers interposed between said piston and said disks, and springs acting on said disks in opposition to said levers and serving by their stress to quickly free all of said disks from engagement with each other when the pressure in the pressure-cylinder is relaxed and the brake is to be let off.

3. The combination with a stationary part or casing and a driven part or shaft, of a multiple-disk brake comprising disks or rings a portion of which are connected with said stationary part or casing, so as to be restrained from rotation, and a portion of which rotate with said shaft, a pressure-cylinder, a piston therein, and levers interposed between said piston and said disks, said pressure-cylinder being separated from said friction-disks so as to leave an open space between said parts for the free circulation of air.

4. The combination with a stationary part or casing and a driven part or shaft, of a multiple-disk brake comprising disks or rings a portion of which are connected with said stationary part or casing, so as to be restrained from rotation, and a portion of which rotate with said shaft, a pressure-cylinder, a piston therein and operatively connected with said disks or rings to force them into frictional contact when desired, and spider-arms connecting said pressure-cylinder with said frame or casing so as to leave an open space for the free circulation of air between said cylinder and disks.

5. The combination with a stationary part or casing and a driven part or shaft, of a multiple-disk brake comprising disks or rings a portion of which are connected with said stationary part or casing, so as to be restrained from rotation, and a portion of which rotate with said shaft, a pressure-cylinder, a piston therein, levers interposed between said piston and said disks, and spider-arms connecting said pressure-cylinder with said frame or casing so as to leave an open space for the free circulation of air between said cylinder and disks.

6. In a vehicle-brake, the combination with a stationary part or casing and a driven part or shaft, of a multiple-disk brake comprising disks or rings a portion of which are connected with said stationary part or casing, so as to be restrained from rotation, and a portion of which rotate with said shaft, a pressure-cylinder, a piston therein and operatively connected with said disks or rings to force them into frictional contact when desired, and springs by which all of the said disks or rings are held separated or are quickly forced apart and thus freed from engagement with each other when the pressure in the said cylinder is released and the brake is to be let off.

7. The combination with a stationary part or casing and a driven part or shaft, of a multiple-disk brake comprising rings or disks a portion of which are connected with said stationary part or casing, so as to be restrained from rotation, and a portion of which rotate with said shaft, levers for forcing said disks or rings into frictional contact with each other, and means for operating said levers.

8. The combination with a stationary part or casing and a driven part or shaft, of a multiple-disk brake comprising rings or disks a portion of which are connected with said stationary part or casing, so as to be restrained from rotation, and a portion of which rotate with said shaft, ball-bearings for said shaft, levers for forcing said disks or rings into frictional contact with each other, and means for operating said levers.

9. The combination with a stationary part or casing and a driven part or shaft, of a multiple-disk brake comprising rings or disks a portion of which are connected with said stationary part or casing, so as to be restrained from rotation, and a portion of which rotate with said shaft, ball-bearings for said shaft, a fluid-pressure cylinder, a piston therein, and mechanical means for communicating the movements of said piston to said disks or rings to cause them to be forced into frictional contact with each other when desired.

In testimony whereof we affix our signatures in presence of two witnesses.

THOMAS LEGGETT STURTEVANT.
THOMAS JOSEPH STURTEVANT.

Witnesses:
W. H. ELLIS,
F. B. HECKER.